United States Patent [19]

Gaylord

[11] 3,995,099

[45] Nov. 30, 1976

[54] COPOLYMERS OF ENDO AND EXO CIS-5-NORBORNENE-2,3-DICARBOXYLIC ANHYDRIDES

[75] Inventor: Norman G. Gaylord, New Providence, N.J.

[73] Assignee: Borg-Warner Corporation, Chicago, Ill.

[22] Filed: Apr. 30, 1975

[21] Appl. No.: 573,193

Related U.S. Application Data

[63] Continuation-in-part of Ser. No. 470,705, May 16, 1974, abandoned.

[52] U.S. Cl. ............................... 526/271; 526/227; 526/230; 526/283
[51] Int. Cl.² .................................... C08F 22/04
[58] Field of Search ................ 260/78.4 R, 78.5 R; 526/271, 227, 283, 230

[56] References Cited

UNITED STATES PATENTS

| 3,330,815 | 7/1967 | McKeon et al. .................. 260/93.1 |
| 3,494,897 | 2/1970 | Reding et al. ..................... 260/78.5 |

*Primary Examiner*—John Kight, III
*Attorney, Agent, or Firm*—Richard J. Schlott

[57] ABSTRACT

Novel copolymers of the endo and exo cyclic adducts of maleic anhydride and cyclic conjugated dienes such as cyclopentadiene. The copolymers are prepared by heating either of the cyclic adducts in the presence of a free radical precursor, such as a peroxygen compound, at a temperature at which endo-exo isomerization of the adduct occurs.

12 Claims, No Drawings

COPOLYMERS OF ENDO AND EXO CIS-5-NORBORNENE-2,3-DICARBOXYLIC ANHYDRIDES

This application is a continuation-in-part of copending Ser. No. 470,705, filed May 16, 1974 now abandoned.

This invention relates to novel copolymers of the cyclic adducts of maleic anhydride and certain conjugated dienes, and more particularly to novel copolymers of the cyclic adducts from maleic anhydride and cyclic conjugated dienes. The invention also pertains to a process for preparing such copolymers.

The reaction of maleic anhydride with cyclic conjugated dienes such as cyclopentadiene and the isomeric methylcyclopentadienes yields the equimolar cyclic Diels-Alder adducts, endo-cis-5-norbornene-2,3-dicarboxylic anhydride and the 1-, 5- and 7-methyl substituted homologues, respectively. The endo maleic anhydride-cyclopentadiene adduct, m.p. 165° C., undergoes isomerization at elevated temperatures to the exo adduct, m.p. 143° C. The isomerization takes place in the melt (D. Craig, J. Amer. Chem. Soc., 73, 4889 (1951)) or in solution (C. Ganter, U. Scheidegger, and J. D. Roberts, J. Amer. Chem. Soc., 87, 2771 (1965)). When either isomer is heated at a sufficiently elevated temperature, isomerization occurs and mixture of both isomers is obtained. When the heating period is extend the equilibrium composition for that temperature is established. The various endo maleic anhydride-methylcyclopentadiene adducts, prepared from the 1-, 2- and 5-methylcyclopentadienes, similarly undergo isomerization to a mixture of the exo and endo adducts at elevated temperatures (V. A. Mironov, T. M. Fadeeva, A. U. Stepaniantz, and A. A. Akhrem, Tetrahedron Letters, 5823 (1966).

One object of the present invention is to provide novel copolymers of the maleic anhydride-conjugated diene cyclic adducts.

Another object of the present invention is to provide novel copolymers of the maleic anhydride-cyclic conjugated diene adducts.

A further object of the present invention is to provide a process for preparing such novel copolymers.

These and other objects of the present invention will become apparent from the ensuing description and illustrative embodiments.

In accordance with the present invention it has now been found that copolymers of the exo and endo adducts can be obtained by subjecting either of the isomeric Diels-Alder adducts from maleic anhydride and cyclic conjugated dienes to temperatures at which isomerization occurs, in the presence of a free radical precursor.

The cyclic adducts which are useful for preparing the novel copolymers of this invention comprise the equimolar adducts from maleic anhydride and the cyclic conjugated dienes, cyclopentadiene and the isomeric methylcyclopentadienes. The exo and endo adducts as well as mixtures thereof are capable of undergoing polymerization to yield these novel copolymers by the process of the present invention.

The reaction may be carried out in bulk, i.e. in the molten state, or in the presence of an organic solvent which is inert towards the anhydride functionality of the adduct, i.e. a solvent which does not contain reactive hydrogen atoms such alcohols, mercaptans or amines.

The required free radical precursors may be conventional polymerization catalysts including azo compounds, dialkyl peroxides, diacyl peroxides, peresters, hydroperoxides, etc. e.g. azobisisobutyronitrile, di-tert-butyl peroxide, dicumyl peroxide, benzoyl peroxide, tert-butyl peracetate, tert-butyl perbenzoate, tert-butyl hydroperoxide, etc. The free radical precursor is used in catalytic quantities, e.g. 0.01–10% by weight based on adduct, and preferably at temperatures where it has a relatively short half-life.

The minimum reaction temperature employed in the preparation of the novel copolymers of the present invention is the temperature at which endo-exo isomerization occurs. In general, the temperature will range from 170° to 300° C., and preferably from about 190° to 300° C. Either atmospheric or superatmospheric pressures may be employed.

In accordance with one method of carrying out the present invention, the catalyst is added continuously or intermittently over a period of time, to the molten or liquid adduct which is being maintained at the desired reaction temperature. The catalyst may also be added as a solution in an inert solvent to the liquid adduct or a solution thereof at the desired temperature.

The reaction is exothermic and the temperature rise which results from the addition of the catalyst to the adduct is accompanied by refluxing which gradually lowers the temperature of the reaction mixture. The temperature may be maintained at a desired level by extending the catalyst addition time.

The reaction occurs rapidly during the period of catalyst addition and is virtually complete shortly thereafter. Although the reaction may be terminated by cooling at that time, the reaction mixture is generally heated for an additional period to ensure maximum conversion.

When the reaction is carried out in bulk, the copolymer begins to precipitate from the reaction mixture shortly after the reaction is initiated by the addition of the catalyst. When the reaction is completed the mixture is diluted with acetone to dissolve the copolymer, which is then precipitated with chloroform. Other solvent - non-solvent combinations may be used to isolate the copolymer. The copolymer is soluble in dioxane, methyl ethyl ketone, pyridine and dimethylformamide as well as acetone and is insoluble in carbon tetrachloride, chlorobenzene, carbon disulfide, hexane and benzene as well as chloroform. It will be understood that the exact method of recovering the copolymer from the reaction mixture is not a critical feature of this invention, and that any of the known procedures may be readily employed.

In accordance with another method of carrying out the present invention, the catalyst is added continuously or intermittently over a period of time to a solution of the adduct in a solvent which is a non-solvent for the copolymer. In this case the copolymer is precipitated from the reaction mixture during the course of the reaction and may be isolated and purified in the usual manner.

The infrared spectra of the copolymers of endo and exo 5-norbornene-2,3-dicarboxylic anhydride, recorded as films cast on sodium chloride plates from acetone solution, shown absorption peaks at 1760 and 1835 cm$^{-1}$, characteristic of copolymers containing maleic anhydride. Weak peaks are present at 1360 and 1440 cm$^{-1}$ and stronger peaks at 1220, 1080, 940 and 900 cm$^{-1}$. The absence of absorption peaks at 1640 and 3050 cm$^{-1}$ indicates the absence of double bonds. An absorption peak at 730 cm$^{-1}$, characteristic of unsaturated polymers derived from cyclopentene and cyclopentadiene and present in the spectra of the adducts, exo and endo cis-5-norbornene-2,3-dicarboxylic anhydride, is absent in the spectra of the copolymers of this invention, indicating the absence of unsaturation.

The NMR spectra of the copolymers of endo and exo 5-norbornene-2,3-dicarboxylic anhydride, measured at 60 MHz in acetone-d$_6$ using tetramethylsilane as internal standard at 60° C., contain absorption peaks at 6.3, 6.9, 7.3 and 8.2 τ. These peaks are present in the copolymers prepared at a temperature at which isomerization occurs, irrespective of their origin, i.e. whether the copolymers result from the polymerization of the endo adduct, the exo adduct or a mixture of endo and exo adducts. A small absorption peak at 4.0τ indicates that the copolymers have an essentially saturated structure.

Integration of the NMR absorption peaks indicates that the copolymers contain equimolar amounts of units derived from cyclopentadiene and maleic anhydride, in agreement with the composition of the adducts and the elemental analyses of the copolymers.

Although the homopolymer endo-5-norbornene-2,3-dicarboxylic anhydride, prepared by polymerization in the presence of a free radical catalyst at a temperature where endo-exo isomerization does not occur, is soluble in dioxane, the homopolymer of the exo adduct, prepared under the same conditions, is insoluble in dioxane. When the polymerization of a mixture of endo and exo adducts is carried out under the same conditions, the product may be separated into dioxane-soluble and dioxane-insoluble homopolymers. In contrast, the copolymers of the present invention, irrespective of their origin are completely soluble in dioxane.

Although the NMR spectrum of the homopolymer of endo-5-norbornene-2,3-dicarboxlic anhydride contains absorption peaks at 6.3, 6.9, 7.3 and 8.2τ, the absorption peak at 6.3τ is absent from the NMR spectrum of the homopolymer of the exo adduct. In contrast, the NMR spectra of the copolymers of the present invention, irrespective of their origin, contain the absorption peak at 6.3τ.

The invention will be more fully understood by reference to the following illustrative embodiments.

EXAMPLE I

The Diels-Alder adduct from cyclopentadiene and maleic anhydride, endo-cis-5-norbornene-2,3-dicarboxylic anhydride, m.p. 165° C, was heated at 220° C. for 4 hours. On cooling, the product solidified with a melting point of 101° C. The crude reaction product was recrystallized from benzene three times to isolate exo-cis-5-norbornene-2,3-dicarboxylic anhydride, m.p. 141° C., in 25% yield.

The endo adduct was heated at 190° C. for 1.5 hours to yield a mixture of endo and exo adducts with a melting point of 105° C. The mixture contained 55% of the exo adduct and 45% of the endo adduct.

EXAMPLE II

After 2.0 g. of the endo cyclopentadiene-maleic anhydride adduct was placed in a long test tube containing a magnetic stirrer, the tube was sealed with a rubber serum cap. The tube was placed in an oil bath at 175° C. A total of 0.6 ml. of tert-butyl hydroperoxide, containing 70% hydroperoxide and 30% di-tert-butyl peroxide, was added by hypodermic syringe in three equal portions over a period of 10 minutes. The reaction was exothermic and each addition of catalyst was accompanied by the appearance of white fumes in the test tube. The mixture was stirred for an additional 20 minutes at 175° C. after the addition was completed and then cooled to 100° C. Acetone was added to dissolve the reaction mixture which was then precipitated with chloroform. The product was redissolved in acetone, reprecipitated with chloroform and dried in vacuo at 45° C. The copolymer was obtained in 25% yield and had a softening point of 290°–320° C.

Analysis. Calcd. for $C_9H_8O_3$ : C, 65.85; H, 4.88; O, 29.27. Found: C, 65.68; H, 5.15; O, 29.13.

Evaporation of the solvent from the chloroform filtrates resulted in the recovery of a mixture of endo and exo adducts.

EXAMPLE III

The procedure described in Example II was repeated using 1.4 g. of the endo adduct and maintaining the temperature at 225° C. A total of 0.3 ml. of tert-butyl hydroperoxide was added over a period of 5 minutes. The reaction mixture was maintained at 225° C. for an additional 340 minutes before the copolymer was isolated in the manner described in Example II. The yield of copolymer was 23% and the softening point was 290° C. The infrared and nuclear magnetic resonance spectra of the copolymer of the endo and exo adducts indicated the absence of unsaturation.

EXAMPLE IV

A 3-necked flask equipped with a mechanical stirrer, long air condenser and gas inlet tube capped with a rubber serum cap was heated in an oil bath at 230° C. After 15.0 g. of the endo cyclopentadiene-maleic anhydride adduct was charged into the flask and melted, 0.8 ml. of tert-butyl hydroperoxide was added dropwise over 30 minutes. The reaction mixture was cooled after the catalyst addition was completed and the copolymer was isolated in the manner described in Example II. The copolymer isolated in 54% yield had a softening point of 285° C. The infrared spectrum was identical to that of the copolymer obtained in Example III.

EXAMPLE V

The procedure described in Example IV was repeated using 10.0 g. of the endo adduct and a reaction temperature of 240° C. A total of 0.6 ml. of tert-butyl hydroperoxide was added in three equal portions over a 30 minute period. The reaction mixture was stirred for an additional 50 minutes at 240° C. and the copolymer was then isolated in the usual manner. The yield of copolymer was 83% and the softening point was 290° C. The molecular weight of the copolymer, determined cryoscopically in dioxane, was 3250.

EXAMPLE VI

The procedure described in Example IV was repeated using 10.0 g. of the endo adduct and a reaction temperature of 240° C. A total of 0.8 ml. of tert-butyl hydroperoxide was added in four equal portions over 40 minutes. The reaction mixture was maintained at 240° C. for an additional 45 minutes. The copolymer was isolated in the usual manner in 85% yield. The softening point of the copolymer was 300° C. The NMR spectrum of the copolymer at 60MHz at 60° C. showed the essential absence of unsaturation.

EXAMPLE VII

An 80 ml. test tube was charged with 2.0 g. of the endo cyclopentadiene-maleic anhydride adduct and closed with a rubber serum cap. Nitrogen was passed through the tube for 10 minutes. The tube was placed in an oil bath maintained at 240° C. After the adduct melted, 0.18 g. of tert-butyl perbenzoate was added through a hypodermic needle. White fumes were evolved which developed pressure in the tube. The white fumes disappeared after 2 minutes. Another 0.18 g. of tert-butyl perbenzoate was added, followed by an additional 0.18 g. after 5 minutes. The mixture was then held at 240° C. for 10 minutes and cooled. The solidified mass was mixed with 40 ml. chloroform to dissolve the adduct. After standing overnight, the copolymer was filtered and dried in vacuo. The yield of copolymer was 1.05 g. (52%) and the softening point was 285° C.

EXAMPLE VIII

The procedure described in Example VII was repeated adding three 0.18 g. portions of dicumyl peroxide over 15 minutes. Since the peroxide is a solid at 25° C., it was warmed to 50° C., and added to 2.0 g. of endo adduct which was maintained at 240° C. After the catalyst addition was completed the reaction mixture was stirred at 240° C. for 10 minutes. The copolymer was isolated as described in Example VII in 43% yield. The saturated copolymer had a softening point of 288° C.

EXAMPLE IX

The procedure described in Example II was repeated using 2.8 g. of the endo cyclopentadiene-maleic anhydride adduct and maintaining the temperature at 285° C. After 0.3 ml. tert-butyl hydroperoxide was added over 5 minutes, the reaction mixture was maintained at 285° C. for an additional 115 minutes. The copolymer was isolated in 20% yield in the manner described in Example II.

EXAMPLE X

The procedure described in Example II was repeated using 2.0 g. of the exo cyclopentadiene-maleic anhydride adduct, m.p. 141° C., and maintaining the temperature at 240° C. The catalyst tert-butyl hydroperoxide was added in four 0.1 ml. portions over a period of 30 minutes. The mixture was maintained at 240° C. for an additional 50 minutes and the copolymer was isolated in 35% yield in the manner described in Example II. The infrared and NMR spectra of the copolymer, softening point 290° C., were identical to the spectra of the copolymer obtained from the polymerization of the endo adduct. The molecular weight of the copolymer, determined cryoscopically in dioxane, was 2500.

EXAMPLE XI

The endo methylcyclopentadiene-maleic anhydride adduct, 10 ml., was heated in a test tube closed with a rubber serum cap at 240° C. for 1 hour. When 1 ml. of tert-butyl hydroperoxide was added over 15 minutes, the temperature rose to 260° C. Another 1 ml. portion of tert-butyl hydroperoxide was added over 30 minutes and then the tube was kept in the oil bath at 240° C. for an additional hour. The contents of the tube solidified and were dissolved in acetone and precipitated in carbon tetrachloride. The precipitate was extracted in a Soxhlet extractor with carbon tetrachloride for 6 hours and then dried at 105° C. for 2 hours. The copolymer was obtained in 40% yield and had a softening point of 290° C. The molecular weight of the copolymer was 4500 (cryoscopy). The infrared spectrum showed the absence of unsaturation.

EXAMPLE XII

After 2.0 g. of the mixture of endo and exo adducts of cyclopentadiene and maleic anhydride, m.p. 105° C., prepared at 190° C. as described in Example I, was placed in a long test tube, the latter was sealed with a rubber serum cap and placed in an oil bath at 240° C. A total of 0.3 ml. of tert-butyl hydroperoxide was added in six equal increments over a period of 20 minutes. The mixture was maintained at 240° C. for an additional 40 minutes and then cooled. After the mixture was diluted with chloroform, the precipitate was filtered and dried in vacuo. The copolymer was obtained in a yield of 30%.

The novel copolymers of this invention may be converted into numerous derivatives by any of the known reactions for organic compounds containing anhydride groups. Thus, for example, the copolymers containing anhydride groups may be hydrolyzed to produce recurring units which are dicarboxylic acids and which in turn may be converted to mono- or dicarboxylic acid salts. The carboxylic acid groups may be esterified with monohydric alcohols or diazoalkanes to yield monoester acids or diesters, respectively. The anhydride groups may be reacted with monohydric alcohols to produce monoester acids or diesters, depending upon the relative amount of alcohol and the reaction conditions. The anhydride groups may also be reacted with amines to yield monoamide acids or diamides or imides and with ammonium hydroxide to produce the mono- or diammonium salts as well as the monoamide-monoammonium salt. Since the copolymer contains numerous anhydride groups, by controlling the quantity of reagent it is possible to control the extent of reaction.

The preparation of acids and esters from the anhydride copolymers is described in Examples XIII–XV which illustrate the ease with which these and the aforementioned derivatives may be prepared.

EXAMPLE XIII

A solution of 2.0 g. of the copolymer of the exo and endo cyclopentadiene-maleic anhydride adducts in acetone was mixed with 5% aqueous sodium hydroxide. After the mixture was stirred at 50° C. for 1 hour the acetone was removed by evaporation. On acidification with dilute hydrochloric acid, the copolymer precipitated. After filtration, drying and purification by solution in acetone and precipitation in benzene, the product yield was 1.9 g. The elemental analyses and infrared spectrum indicated that the conversion of the anhydride to the acid copolymer was complete.

EXAMPLE XIV

A suspension of 2.0 g. of the acid copolymer, prepared by the procedure described in Example XIII, in 20 ml. benzene was treated with 1.5 g. of diazomethane in 150 ml. diethyl ether at 5° C. for 22 hours. After removal of the ether in vacuo, the resultant clear benzene solution was treated with hexane to precipitate 2.38 g. of the diester copolymer.

Analysis. Calcd. for $C_{11}H_{14}O_4$: C, 62.86; H, 6.66. Found: C, 62.97; H, 6.51.

The infrared and NMR spectra confirmed that the conversion of the acid to the diester copolymer was complete.

EXAMPLE XV

A mixture of 4.4 g. of the copolymer from endo-cis-5-norbornene-2,3-dicarboxylic anhydride and 0.1 g. of p-toluenesulfonic acid in 100 ml. of methanol was refluxed for 48 hours. The solvent was removed in vacuo and the residual brown solid was extracted with benzene. The benzene-soluble fraction was washed with an aqueous sodium bicarbonate solution and the benzene-insoluble fraction was extracted with an aqueous sodium hydroxide solution. The combined aqueous extracts were acidified with dilute hydrochloric acid to precipitate 2.62 g. of the half ester copolymer.

Analysis. Calcd. for monomethyl ester copolymer $C_{10}H_{12}O_4$: C, 61.20; H, 6.15. Found: C, 61.84; H, 6.34.

The benzene-soluble fraction, when precipitated in hexane, yielded 2.47 g. of the dimethyl ester copolymer, characterized from elemental analyses and infrared and NMR spectra.

The absence of unsaturation in the copolymers of this invention is further confirmed by examination of the infrared and NMR spectra of the ester derivatives of the anhydride copolymer. Thus, the infrared spectra of the monomethyl and dimethyl ester copolymers resemble that of the anhydride copolymer except that the anhydride absorption is replaced by the carbonyl absorption at 1720 $cm^{-1}$, accompanied by the hydroxyl absorption at 3300 $cm^{-1}$, and the peak at 1080 $cm^{-1}$ is shifted to 1035 $cm^{-1}$. The absence of unsaturation is evident from the 730, 1600 and 3000 $cm^{-1}$ regions.

The NMR spectra of the monomethyl and dimethyl ester copolymers show no absorption below $6.0\tau$. The absence of a peak at $4.0\tau$ indicates the absence of unsaturation. Integration of the methoxy resonance in the monomethyl and dimethyl ester copolymers confirm the presence of equimolar units derived from cyclopentadiene and maleic ester, in agreement with the elemental analyses.

The absence of unsaturation in the copolymers of cis-5-norbornene-2,3-dicarboxylic anhydride, whether prepared by polymerization of the endo or exo Diels-Alder adducts or a mixture thereof, at temperatures at which endo-exo isomerization occurs, clearly distinguishes the products and the process of the present invention from those of the prior art.

U.S. Pat. No. 3,491,068 discloses the preparation of equimolar, alternating copolymers of maleic anhydride and acyclic conjugated dienes by the copolymerization of the diene and maleic anhydride in the presence of a free radical generator at a temperature at which the free radical precursor has a half-life of 60 minutes or less. The copolymers are characterized by the presence of unsaturation, i.e. there is one double bond in the equimolar copolymer for each structural unit derived from the diene.

Equimolar, alternating copolymers are also prepared by the copolymerization of furan and maleic anhydride at temperatures above 40° C. in the presence of free radical catalysts (N.G. Gaylord, S. Maiti, B. K. Patnaik, and A. Takahashi, J. Macromol. Sci.-Chem., A6, 1459 (1972)). The copolymers are characterized by the presence of one double bond in the equimolar copolymer for each furan unit. The identical unsaturated copolymer is formed at temperatures above 60° C. from the furan-maleic anhydride Diels-Alder adduct which undergoes dissociation to the comonomers at such temperatures.

The copolymers of the present invention differ from the acyclic conjugated diene-maleic anhydride copolymers as well as the furan-maleic anhydride copolymers of the prior art in that they are essentially fully saturated and in that they cannot be prepared by the disclosed processes unless the reaction temperature is that at which endo-exo isomerization of the adduct occurs.

The novel copolymers of the present invention may be employed as thickeners, stabilizers, dispersants, binders, emulsifiers, textile and paper sizing agents, leveling agents in floor polishes, etc.

The polyanhydrides or half acids may be utilized to cure epoxy, alkyd, amine-formaldehyde, thermosetting acrylic and other resins containing reactive functional groups or may themselves be cured by agents containing such functionality.

While particular embodiments of this invention are shown above, it will be understood that the invention is obviously subject to variations and modifications without departing from its broader aspects.

What is claimed is:

1. A copolymer consisting of endo and exo 5-norbornene-2,3-dicarboxylic anhydride.

2. A copolymer consisting of endo and exo methyl-5-norbornene-2,3-dicarboxylic anhydride.

3. A copolymer consisting of the endo and exo cyclic adducts derived from maleic anhydride and a cyclic conjugated diene, said diene selected from the group consisting of cyclopentadiene and methylcyclopentadiene.

4. A process for the preparation of copolymers consisting of cyclic adducts derived from maleic anhydride and a cyclic conjugated diene, said diene selected from the group consisting of cyclopentadiene and methylcyclopentadiene, which comprises heating said adduct in the presence of a free radical precursor, at a reaction temperature which is a temperature of endo-exo isomerization of the adduct.

5. The process of claim 4 wherein said adduct is the endo isomer.

6. The process of claim 4 wherein said adduct is the exo isomer.

7. The process of claim 4 wherein said adduct is a mixture of the endo and exo isomers.

8. The process of claim 4 wherein said free radical precursor is a peroxygen compound.

9. The process of claim 8 wherein said peroxygen compound is selected from the group consisting of peroxides, peresters and hydroperoxides.

10. The process of claim 4 wherein said reaction temperature is between 170° and 300° C.

11. The process of claim 4 wherein said reaction temperature is above 200° C.

12. The process of claim 4 wherein said free radical precursor is added to the adduct at the reaction temperature.

* * * * *